United States Patent
Tanaka

(10) Patent No.: US 11,507,270 B2
(45) Date of Patent: Nov. 22, 2022

(54) TOUCH INPUT DEVICE, TOUCH INPUT METHOD AND RECORDING MEDIUM RECORDING TOUCH INPUT PROGRAM

(71) Applicant: SHARP KABUSHIKI KAISHA, Sakai (JP)

(72) Inventor: Sachio Tanaka, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 17/674,240

(22) Filed: Feb. 17, 2022

(65) Prior Publication Data
US 2022/0283702 A1 Sep. 8, 2022

(30) Foreign Application Priority Data
Mar. 2, 2021 (JP) .............................. JP2021-032367

(51) Int. Cl.
*G06F 3/04883* (2022.01)
*G06F 3/044* (2006.01)
*G06F 3/0354* (2013.01)

(52) U.S. Cl.
CPC ...... *G06F 3/04883* (2013.01); *G06F 3/03545* (2013.01); *G06F 3/044* (2013.01)

(58) Field of Classification Search
CPC ... G06F 3/03545; G06F 3/044; G06F 3/04883
See application file for complete search history.

(56) References Cited

U.S. PATENT DOCUMENTS

| | | | |
|---|---|---|---|
| 6,771,266 B2 * | 8/2004 | Lui | G06T 5/002 345/442 |
| 10,338,725 B2 * | 7/2019 | Tu | G06F 3/0412 |
| 10,719,168 B2 * | 7/2020 | Tu | G06V 30/1423 |
| 2006/0038789 A1 * | 2/2006 | Ban | G06F 1/1616 345/169 |
| 2012/0256944 A1 * | 10/2012 | Crumly | G06V 30/1423 345/611 |
| 2013/0136377 A1 * | 5/2013 | Luo | G06T 11/60 382/275 |
| 2015/0022462 A1 * | 1/2015 | Locker | G06F 3/04883 345/173 |
| 2016/0092021 A1 * | 3/2016 | Tu | G06F 3/0237 345/173 |
| 2016/0364118 A1 * | 12/2016 | Foerster | G06F 3/0237 |
| 2019/0220137 A1 * | 7/2019 | Tu | G06V 30/1423 |

FOREIGN PATENT DOCUMENTS

JP H06-89345 A 3/1994

\* cited by examiner

*Primary Examiner* — Michael Pervan
(74) *Attorney, Agent, or Firm* — ScienBiziP, P.C.

(57) ABSTRACT

A touch input device includes: a position detector that determines an input range in a touch input produced with an inputter on a touch panel and that detects, as a touch position, any position within the input range; a line information generator that generates line information which is information of a line connecting a plurality of the touch positions detected with the position detector; a smoothing level setter that sets, based on the area of the input range, a smoothing level indicating the degree of smoothing; and a smoothing processing processor that executes, on the line of the line information generated by the line information generator, smoothing corresponding to the smoothing level set by the smoothing level setter.

8 Claims, 8 Drawing Sheets

FIG. 2

| TIME | MEASURED VALUES | PREDICTED VALUES |
|---|---|---|
| ... | ... | ... |
| t−2 | X(t−2), Y(t−2) | A(t−2), B(t−2) |
| t−1 | X(t−1), Y(t−1) | A(t−1), B(t−1) |
| t | X(t), Y(t) | A(t), B(t) |
| t+1 | − | A(t+1), B(t+1) |
| ... | − | − |

D1

TOUCH INPUT DEVICE, TOUCH INPUT METHOD AND RECORDING MEDIUM RECORDING TOUCH INPUT PROGRAM

INCORPORATION BY REFERENCE

This application is based upon and claims the benefit of priority from the corresponding Japanese Patent Application No. 2021-032367 filed on Mar. 2, 2021, the entire contents of which are incorporated herein by reference.

BACKGROUND

The present disclosure relates to a touch input device, a touch input method and a recording medium which records a touch input program.

Conventionally, a technique is known in which, when a user uses a touch pen to produce a handwriting input on a touch panel, a line which connects coordinates corresponding to input positions is drawn with a smooth curve. For example, in the technique described above, a line between two points corresponding to the input positions is interpolated with an arc which passes through the coordinates of three points including the two points and the subsequent point.

Incidentally, when an input of an input range having a predetermined area is produced on a touch panel, any position in the input range may be determined as an input position. In this case, when an inputter for the touch panel is an inputter, such as a touch pen, in which its tip is thin to have a small input area on the touch panel, since only a small variation in the position which is determined as the input position in the input range on the touch panel is produced, a smooth line corresponding to the movement of the inputter can be drawn. However, when the inputter for the touch panel is an inputter, such as a finger of a user, in which its tip is thick to have a large input area on the touch panel, since a large variation in the position which is determined as the input position in the input range on the touch panel is produced, it is difficult to draw a smooth line corresponding to the movement of the inputter.

SUMMARY

An object of the present disclosure is to provide a touch input device which can draw a line corresponding to the movement of an inputter that produces a touch input on a touch panel, a touch input method and a recording medium which records a touch input program.

A touch input device according to an aspect of the present disclosure includes: a position detector that determines an input range in a touch input produced with an inputter on a touch panel and that detects, as a touch position, any position within the input range; a line information generator that generates line information which is information of a line connecting a plurality of the touch positions detected with the position detector; a smoothing level setter that sets, based on the area of the input range, a smoothing level indicating the degree of smoothing; and a smoothing processor that executes, on the line of the line information generated by the line information generator, smoothing corresponding to the smoothing level set by the smoothing level setter.

A touch input method according to another aspect of the present disclosure is a method of causing one or a plurality of processors to execute: a position detection step of determining an input range in a touch input produced with an inputter on a touch panel and detecting, as a touch position, any position within the input range; a line information generation step of generating line information which is information of a line connecting a plurality of the touch positions detected in the position detection step; a smoothing level setting step of setting, based on the area of the input range, a smoothing level indicating the degree of smoothing; and a smoothing step of executing, on the line of the line information generated in the line information generation step, smoothing corresponding to the smoothing level set in the smoothing level setting step.

A recording medium according to another aspect of the present disclosure records a program for instructing one or a plurality of processors to execute: a position detection step of determining an input range in a touch input produced with an inputter on a touch panel and detecting, as a touch position, any position within the input range; a line information generation step of generating line information which is information of a line connecting a plurality of the touch positions detected in the position detection step; a smoothing level setting step of setting, based on the area of the input range, a smoothing level indicating the degree of smoothing; and a smoothing step of executing, on the line of the line information generated in the line information generation step, smoothing corresponding to the smoothing level set in the smoothing level setting step.

According to the present disclosure, it is possible to provide a touch input device which can draw a line corresponding to the movement of an inputter that produces a touch input on a touch panel, a touch input method and a recording medium which records a touch input program.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 2 is a diagram showing an example of detection information utilized in the touch input device according to the embodiment of the present disclosure.

DETAILED DESCRIPTION

Embodiments of the present disclosure will be described below with reference to accompanying drawing. The following embodiments are examples obtained by embodying the present disclosure, and are not intended to limit the technical scope of the present disclosure.

Figure 1:
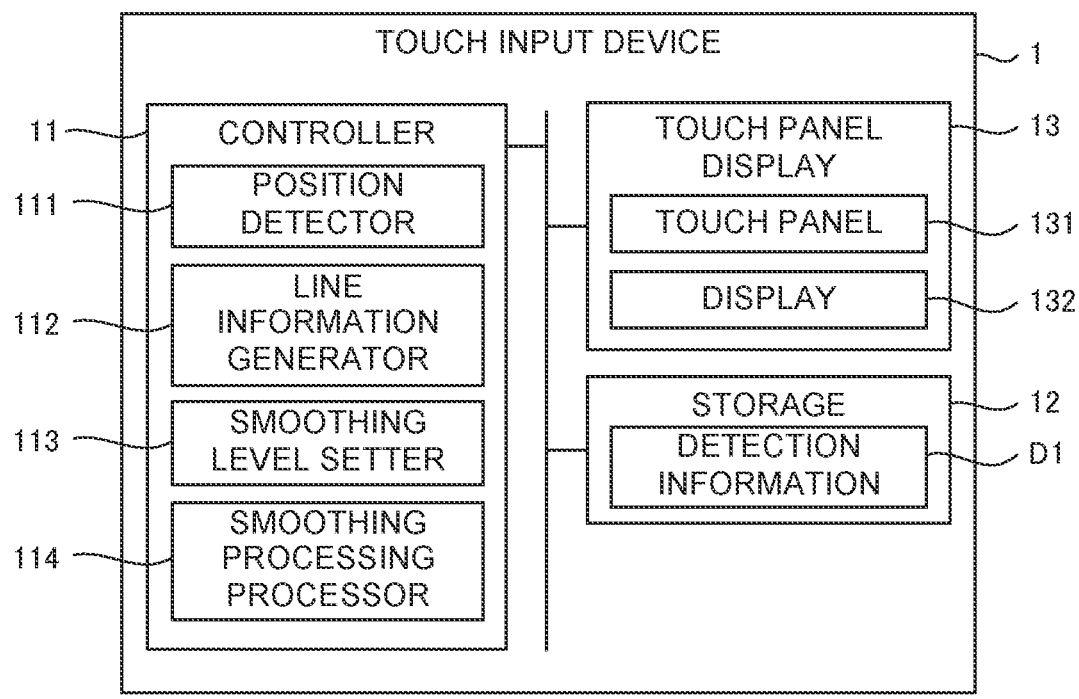
FIG. 1 is a block diagram showing the configuration of a touch input device according to an embodiment of the present disclosure.

As shown in FIG. 1, a touch input device 1 according to an embodiment of the present disclosure includes a controller 11, a storage 12 and a touch panel display 13.

For example, a user executes a predetermined application in the touch input device 1 to perform a touch operation with a predetermined inputter on an operation screen displayed on a display 132. The inputter is a finger of the user, a touch pen (such as a stylus pen or an electronic pen) or the like.

The touch panel display 13 includes a touch panel 131 and the display 132. The display 132 is a display which displays an image and is, for example, a liquid crystal display.

The touch panel 131 receives the touch operation performed by the user on the touch panel 131. The touch panel 131 may be a capacitive touch panel, an infrared touch panel or a pressure sensitive touch panel. In other words, the touch panel 131 is preferably a device which can receive the touch operation performed by the user. The touch panel 131 may he arranged on the front surface of the display 132 or may be incorporated in the display 132. The touch panel 131 and the display 132 may be arranged in positions apart from each other and configured to be able to communicate with each other. In the following description, an integrated touch panel display 13 in which the capacitive touch panel 131 is arranged on the front surface of the display 132 and in which the touch panel 131 and the display 132 are integrally formed is used as an example.

The storage 12 is a nonvolatile storage, such as an HDD (Hard Disk Drive) or an SSD (Solid State Drive), which stores various types of information. In the storage 12, data such as detection information D1 (see FIG. 2) is stored. The details of the detection information D1 will be described later.

In the storage 12, control programs such as a touch input program for instructing the controller 11 to execute touch input processing (see FIG. 10) which will be described later are stored. For example, the touch input program is recorded, in a non-transitory manner, in a computer-readable recording medium such as a CD or a DVD, is read with a reading device (not shown) such as a CD drive or a DVD drive included in the touch input device 1 and is stored in the storage 12. The touch input program may be distributed from a cloud server to be stored in the storage 12.

The controller 11 includes control devices such as a CPU, a ROM and a RAM. The CPU is a processor which executes various types of computation processing. The ROM is a nonvolatile storage in which control programs such as a BIOS and an OS for instructing the CPU to execute the various types of computation processing are previously stored. The RAM is a volatile or nonvolatile storage which stores various types of information, and is used as a temporary storage memory (workspace) for various types of processing executed by the CPU. The controller 11 causes the CPU to execute various types of control programs previously stored in the ROM or the storage 12 to control the touch input device 1.

Figure 3:
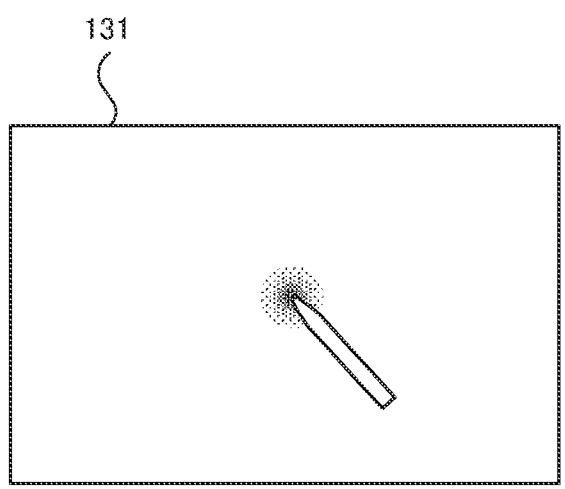
FIG. 3 is a diagram showing an example of a touch operation performed in the touch input device according to the embodiment of the present disclosure.
Figure 4:
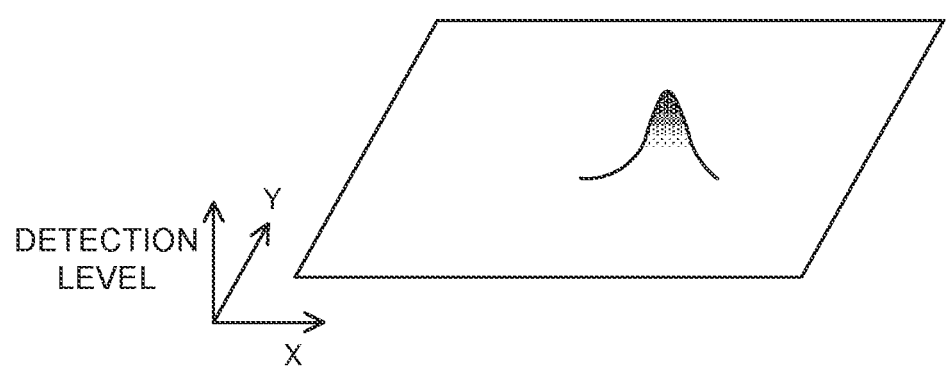
FIG. 4 is a diagram showing an example of the detection of a touch position in the touch input device according to the embodiment of the present disclosure.

Here, an example of a method of detecting a touch position (input position) will be described. FIG. 3 schematically shows a state where a touch pen is used to produce a touch input on the touch panel 131. FIG. 4 shows, when the display screen of the touch panel 131 is assumed to be an XY plane, the distribution of detection levels of capacitances corresponding to XY coordinates in the touch position. For example, the controller 11 detects, as the touch position, the barycentric coordinates of the peak of the detection levels of capacitances.

Figure 5:
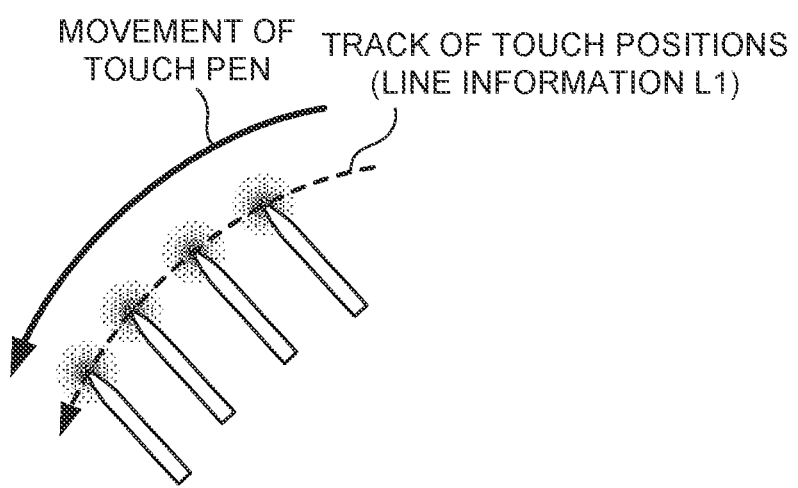
FIG. 5 is a diagram showing an example of the touch position detected in the touch input device according to the embodiment of the present disclosure.

When the inputter is an inputter, such as the touch pen, in which its tip is thin to have a small input area on the touch panel 131, since as shown in FIG. 5, only a small variation in the position (barycentric position) which is determined as the touch position in an input range on the touch panel 131 is produced, a smooth line corresponding to the movement of the touch pen can be drawn.

Figure 7:
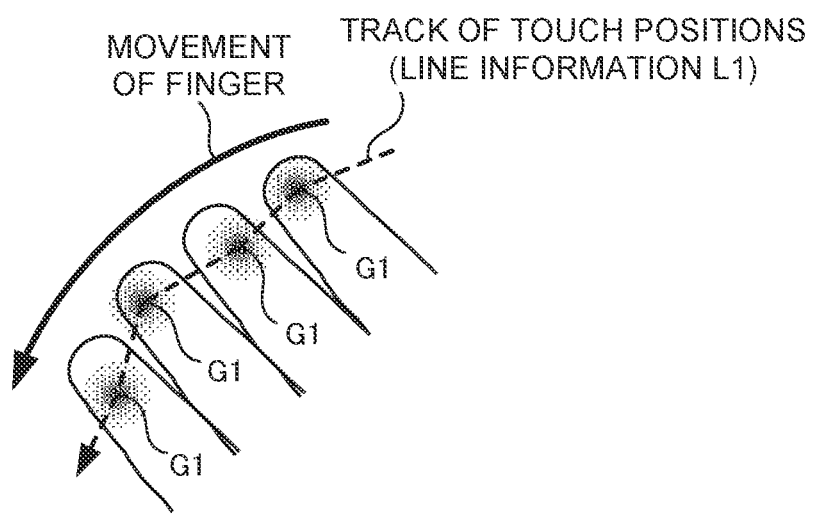
FIG. 7 is a diagram showing an example of the touch position detected in the touch input device according to the embodiment of the present disclosure.

By contrast, FIG. 3 schematically shows a state where a finger of the user is used to produce a touch input on the touch panel 131. When the inputter is an inputter, such as the finger of the user, in which its tip is thick to have a large input area on the touch panel 131, since as shown in FIG. 7, a large variation in the position (barycentric position G1) which is determined as the touch position in an input range on the touch panel 131 is produced, it is difficult to draw a smooth line corresponding to the movement of the finger. In this respect, the touch input device 1 according to the present embodiment has a configuration capable of drawing a line corresponding to the movement of the inputter which produces a touch input on the touch panel 131.

Specifically as shown in FIG. 1, the controller 11 includes various types of processing processors such as a position detector 111, a line information generator 112, a smoothing level setter 113 and a smoothing processing processor 114. The controller 11 causes the CPU to execute various types of processing corresponding to the touch input program to function as the position detector 111, the line information generator 112, the smoothing level setter 113 and the smoothing processing processor 114. Part or all of the processing processors included in the controller 11 may be formed with an electronic circuit. The touch input program may be a program for instructing a plurality of processors to function as the various types of processing processors.

The position detector 111 detects the touch position of the touch operation performed by the user on the touch panel 131. Specifically, the position detector 111 detects, in the touch panel 131 (the display surface of the display 132), position coordinates input (specified) with the inputter (such as the finger of the user or the touch pen). For example, the position detector 111 detects a change in the capacitance between the inputter and the touch panel 131 to detect the position coordinates.

Figure 6:
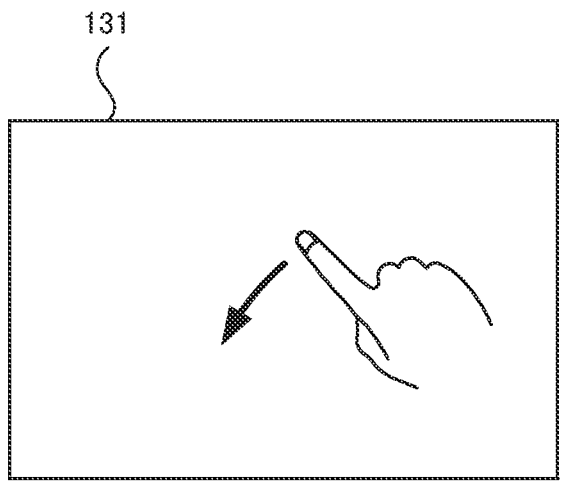
FIG. 6 is a diagram showing an example of the touch operation performed in the touch input device according to the embodiment of the present disclosure.

The position detector 111 determines an input range in a touch input produced with the inputter on the touch panel 131 and detects, as a touch position, any position within the input range. For example, the position detector 111 determines, as the input range, a region in which a detection value (detection level shown in FIG. 4) in the touch panel 131 is equal to or greater than a predetermined value. For example, the position detector 111 determines, as the input range, a contact region (contact area) of the touch panel 131 and the inputter. When the inputter is the touch pen (see FIG. 3), the contact region is small whereas when the inputter is the finger of the user (see FIG. 6), the contact region is large as compared with the touch pen.

The position detector 111 detects, as the touch position, the barycentric position G1 in the input range. For example, the position detector 111 detects, as the touch position, the barycentric position G1 in the contact region. In an example shown in FIG. 7, the barycentric position G1 in the contact region by the finger of the user is shown. The position detector 111 registers, in measured values in the detection information D1, the touch positions which are detected (see FIG. 2). Each time the touch panel 131 is touched with the finger, a variation in the barycentric position G1 can be produced in the contact region according to the state of contact between the finger and the touch panel 131.

The position detector 111 may detect the touch position based on the detection level which is changed when the inputter touches the touch panel 131 or may detect the touch position based on the detection level which is changed when the inputter approaches the touch panel 131, that is, based on the detection level which is changed in a state where the inputter is not in contact therewith. In other words, the input method (touch operation using the inputter in the present disclosure includes a contact touch operation and a non-contact touch operation.

The line information generator 112 generates line information L1 which is the information of a line connecting a plurality of touch positions described above that are detected with the position detector 111. The line information generator 112 generates the line information L1 based on the measured values in the detection information D1. For example, when the inputter is the touch pen, the line information generator 112 generates smooth line information L1 as shown in FIG. 5. On the other hand, when the inputter is the finger of the user, the line information generator 112 generates uneven line information L1 as shown FIG. 7.

The smoothing level setter 113 sets a smoothing level which is used by the smoothing processing processor 114 for smoothing the line of the line information L1. Specifically, the smoothing level setter 113 sets the smoothing level indicating the degree of smoothing based on the area of the input range which is determined with the position detector 111.

When the area of the input range is equal to or less than a threshold value, the smoothing level setter 113 sets the smoothing level to a first smoothing level α1 whereas when the area of the input range is greater than the threshold value, the smoothing level setter 113 sets the smoothing level to a second smoothing level α2 having a higher degree of smoothing than the first smoothing level α1. The threshold value is previously set according to the inputter.

For example, the smoothing level setter 113 sets, as the smoothing level, a smoothing parameter α (smoothing constant) in an exponential smoothing method. The first smoothing level α1 and the second smoothing level α2 are examples of the smoothing parameter α. In other words, the first smoothing level α1 corresponds to a first smoothing parameter α1, and the second smoothing level α2 corresponds to a second smoothing parameter α2.

The smoothing processing processor 114 executes, on the line of the line information L1 generated by the line information generator 112, smoothing corresponding to the smoothing level set by the smoothing level setter 113. Specifically, the smoothing processing processor 114 uses the exponential smoothing method based on the smoothing parameter α set by the smoothing level setter 113 to execute processing for smoothing the line of the line information L1.

Figure 8:
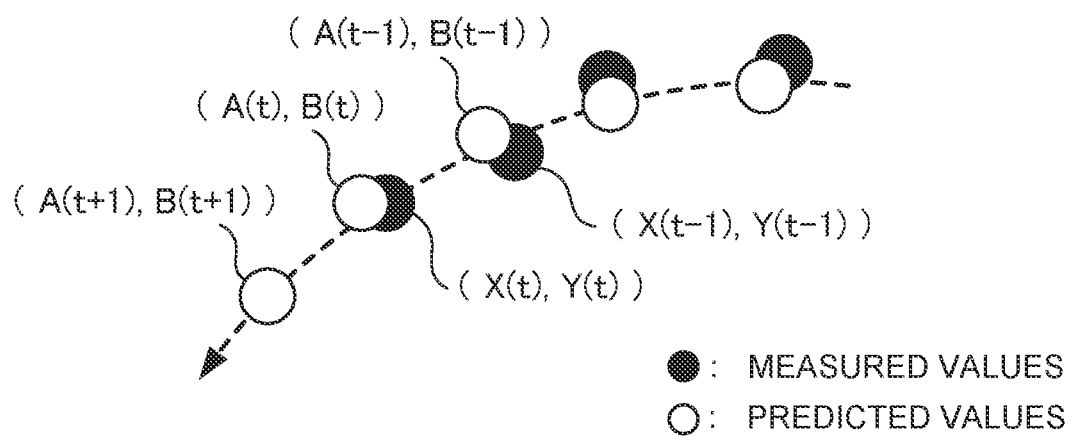
FIG. 8 is a diagram for illustrating smoothing processing executed in the touch input device according to the embodiment of the present disclosure.

FIG. 8 is a diagram for illustrating the smoothing processing using the exponential smoothing method. For example, the smoothing processing processor 114 uses the following calculation formulae corresponding to the exponential smoothing method to predict the touch position.

Predicted value $A$ of $X$ coordinate $(t+1)=\alpha X(t)+(1-\alpha)A(t)$

Predicted value $B$ of $Y$ coordinate $(t+1)=\alpha Y(t)+(1-\alpha)B(t)$

In the calculation formulae described above, X(t) represents the measured value of the X coordinate in a touch position at time t, and Y(t) represents the measured value of the Y coordinate in the touch position at time t. A(t) represents the predicted value of the X coordinate in the touch position at time t, and Y(t) represents the predicted value of the Y coordinate in the touch position at time t. The predicted value A(t+1) of the X coordinate and the predicted value B(t+1) of the Y coordinate at time t+1 subsequent to time t are calculated based on the measured values and the predicted values at time t. The smoothing parameter α is a coefficient which satisfies 0<α<1.

As indicated in the calculation formulae described above, as the smoothing parameter α is increased, the influence of the measured values (X, Y) is increased to decrease (reduce) the degree of smoothing whereas when the smoothing parameter α is decreased, the influence of the past predicted values (A, B) is increased to increase (intensify) the degree of smoothing.

The smoothing processing processor 114 registers the predicted values of the touch position calculated by the calculation formulae described above in the predicted values in the detection information D1 (see FIG. 2). For example, the smoothing processing processor 114 registers, at time t, in the detection information D1, the predicted values for time t+1 calculated by the exponential smoothing method. Then, the smoothing processing processor 114 corrects the line of the line information L1 drawn with the measured values to a line connecting the predicted values (A, B), and executes smoothing.

Here, for example, when the inputter is the touch pen, since the area of the input range is equal to or less than the threshold value, the smoothing level setter 113 sets the smoothing parameter α to the first smoothing parameter α1. By contrast, for example, when the inputter is the finger of the user, since the area of the input range is greater than the threshold value, the smoothing level setter 113 sets the smoothing parameter α to the second smoothing parameter α2 (where α1>α2).

When the inputter is the touch pen, the smoothing processing processor 114 uses the following calculation formulae to calculate the predicted values of the touch position.

Predicted value $A$ of $X$ coordinate $(t+1)=\alpha 1 X(t)+(1-\alpha 1)A(t)$

Predicted value $B$ of $Y$ coordinate $(t+1)=\alpha 1 Y(t)+(1-\alpha 1)B(t)$

When the inputter is the finger of the user, the smoothing processing processor 114 uses the following calculation formulae to calculate the predicted values of the touch position.

Predicted value $A$ of $X$ coordinate $(t+1)=\alpha 2 X(t)+(1-\alpha 2)A(t)$

Predicted value $B$ of $Y$ coordinate $(t+1)=\alpha 2 Y(t)+(1-\alpha 2)B(t)$

In this way, when the inputter is the touch pen, the influence of the measured values (X, Y) is increased to decrease the degree of smoothing. Hence, as shown in FIG. 5, the smooth line corresponding to the movement of the touch pen can be drawn.

Figure 9:
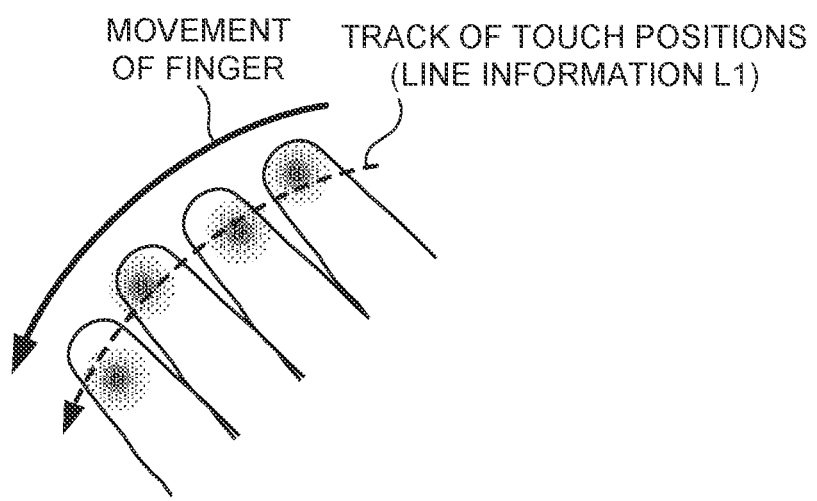
FIG. 9 is a diagram showing an example of a touch position when the smoothing processing is executed in the touch input device according to the embodiment of the present disclosure.

By contrast, when the inputter is the finger of the user, the influence of the past predicted values (A, B) is increased to increase the degree of smoothing. Hence, as shown in FIG. 9, the smooth line corresponding to the movement of the finger of the user can be drawn.

In another embodiment, the smoothing level setter 113 may set the smoothing level such that as the area of the input range is increased, the degree of smoothing is increased. In other words, as the area of the input range is increased, the smoothing level setter 113 sets the smoothing parameter α to a smaller value. In this way, as the area of the input range is increased, the influence of the past predicted values (A, B) is increased to intensify the degree of smoothing. As the area of the input range is decreased, the influence of the measured values (X, Y) is increased to reduce the degree of smoothing.

The smoothing method of the present disclosure is not limited to the method using the exponential smoothing method, and a known method can be applied.

Touch Input Processing

Figure 10:
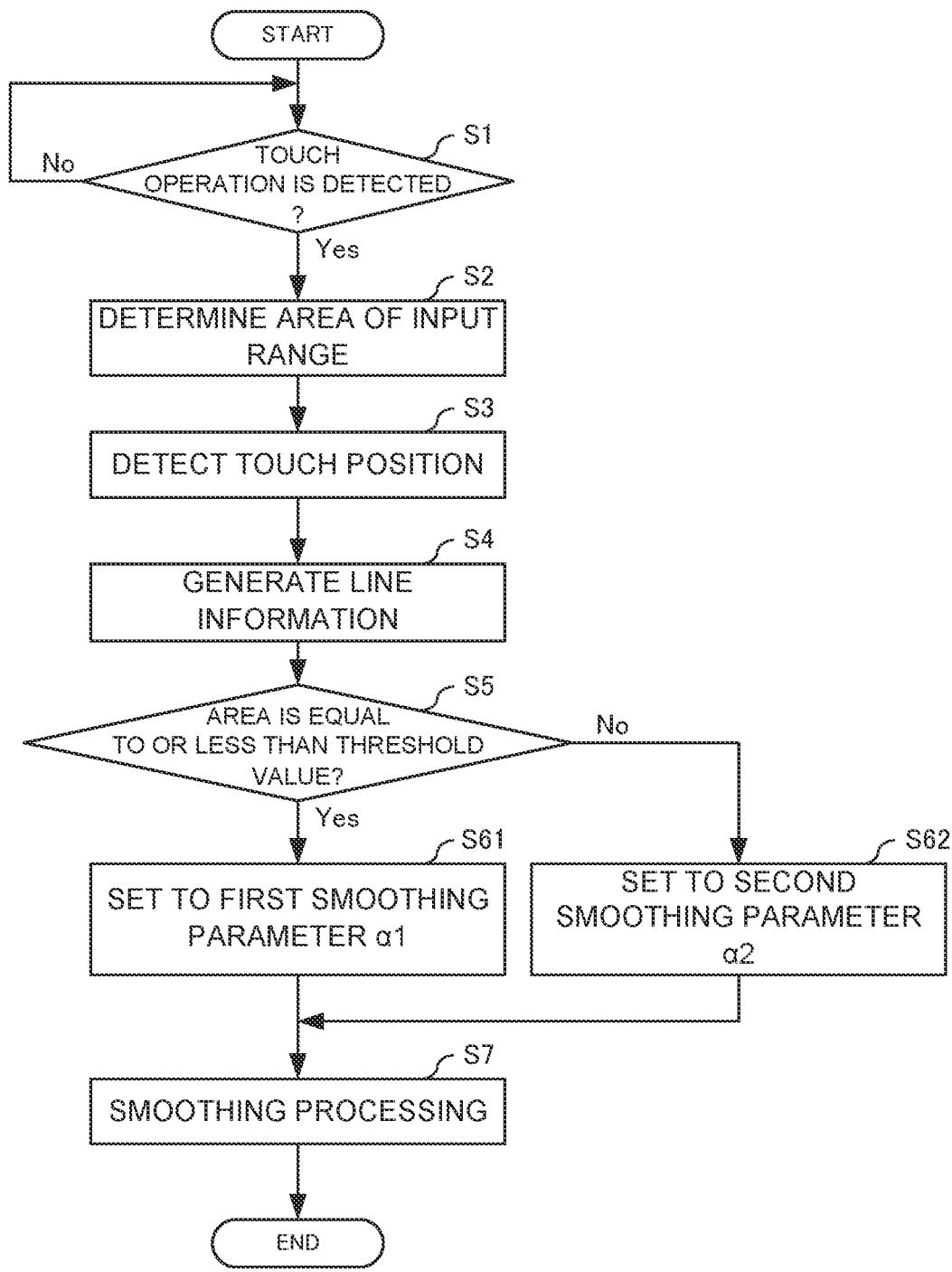
FIG. 10 is a flowchart for illustrating an example of a procedure for touch input processing executed in the touch input device according to the embodiment of the present disclosure.

The touch input processing executed by the controller 11 of the touch input device 1 will be described below with reference to FIG. 10.

The present disclosure can be regarded as the disclosure of a touch input method of executing one or a plurality of steps included in the touch input processing, and the one or a plurality of steps included in the touch input processing described here may be omitted as necessary. The order of the steps to be executed in the touch input processing may be different as long as the same operational effects are exerted. Furthermore, although an example where the controller 11 executes the steps in the touch input processing will be described here, a touch input method in which the steps in the touch input processing are dispersed to a plurality of processors to be executed can be considered as another embodiment.

In step S1, the controller 11 first determines whether or not the touch operation (touch input) performed by the user on the touch panel 131 is detected, and when the touch operation is detected (S1: yes), the processing is transferred to step S2. The controller 11 is on standby until the touch operation is detected (S1: no).

Then, in step S2, the controller 11 determines an input range in the touch operation performed with the inputter on the touch panel 131. For example, the controller 11 determines, as the input range, the region in which the detection value (detection level shown in FIG. 4) in the touch panel 131 is equal to or greater than the predetermined value. The controller 11 determines, as the input range, the contact region (contact area) of the touch panel 131 and the inputter.

Then, in step S3, the controller 11 detects a touch position (position coordinates) in the touch operation. Specifically, the controller 11 detects, as the touch position, a barycentric position in the input range. For example, the controller 11 detects, as the touch position, a barycentric position in the contact region. In the example shown in FIG. 7, the controller 11 detects, as the touch position, the barycentric position G1 in the contact region by the finger of the user. The controller 11 registers the detected touch position in the measured values in the detection information D1 (see FIG. 2). Steps S1 to S3 are an example of a position detection step in the present disclosure.

Then, in step S4, the controller 11 generates the line information L1 which is the information of a line connecting a plurality of touch operations described above that are detected. Specifically, the controller 11 generates the line information L1 based on the measured values in the detection information D1. Step S4 is an example of a line information generation step in the present disclosure.

Then, in step S5, the controller 11 determines whether or not the area of the input range (for example, the contact region of the touch panel 131 and the inputter) is equal to or less than the threshold value. When the area of the input range is equal to or less than the threshold value (S5: yes), the processing is transferred to step S61 whereas Then the area of the input range is greater than the threshold value (S5: no), the processing is transferred to step S62.

In step S61, the controller 11 sets the smoothing parameter a (smoothing constant) in the exponential smoothing method to the first smoothing parameter α1. On the other hand, in step S62, the controller 11 sets the smoothing parameter α in the exponential smoothing method to the second smoothing parameter α2 (where α1>α2).

As described above, for example, when the inputter is the touch pen, since the area of the input range is equal to or less than the threshold value, the controller 11 sets the smoothing parameter α to the first smoothing parameter α1. On the other hand, for example, when the inputter is the finger of the user, since the area of the input range is greater than the threshold value, the controller 11 sets the smoothing parameter α to the second smoothing parameter α2 (where α1>α2). After steps S61 and S62, the processing is transferred to step S7. Steps S61 and S62 are an example of a smoothing level setting step in the present disclosure.

In step S7, the controller 11 uses the exponential smoothing method to execute smoothing processing corresponding to the first smoothing parameter α1 or the second smoothing parameter α2 on the line of the line information L1. Specifically, when the inputter is the touch pen (S61), the controller 11 uses the following calculation formulae to calculate the predicted values of the touch position.

Predicted value $A$ of $X$ coordinate $(t+1)=\alpha 1 X(t)+(1-\alpha 1)A(t)$

Predicted value $B$ of $Y$ coordinate $(t+1)=\alpha 1 Y(t)+(1-\alpha 1)B(t)$

When the inputter is the finger of the user (S62), the controller 11 uses the following calculation formulae to calculate the predicted values of the touch position.

Predicted value $A$ of $X$ coordinate $(t+1)=\alpha 2 X(t)+(1-\alpha 2)A(t)$

Predicted value $B$ of $Y$ coordinate $(t+1)=\alpha 2 Y(t)+(1-\alpha 2)B(t)$

Then, the controller 11 executes smoothing processing to correct the line of the line information L1 to a line connecting the predicted values (A, B). In this way, when the inputter is the touch pen, the influence of the measured values (X, Y) is increased to reduce the degree of smoothing, and thus a smooth line corresponding to the movement of the touch pen can be drawn (see FIG. 5). When the inputter is the finger of the user, the influence of the past predicted values (A, B) is increased to intensify the degree of smoothing, and thus a smooth line corresponding to the movement of the finger of the user can be drawn (see FIG. 9). Step S7 is an example of a smoothing step in the present disclosure.

As described above, the touch input device 1 according to the present embodiment determines the input range in the touch input produced with the inputter (such as the finger of the user or the touch pen) on the touch panel 131, detects, as the touch position, any position within the input range and generates the line information L1 which is the information of the line connecting a plurality of touch positions described above that are detected. The touch input device 1 sets, based on the area of the input range, the smoothing level (smoothing parameter $\alpha$) indicating the degree of smoothing, and executes, on the line of the generated line information L1, smoothing corresponding to the smoothing level which is set.

In the configuration described above, when the inputter for the touch panel 131 is an inputter, such as the touch pen, in which its tip is thin to have a small input area on the touch panel 131, since only a small variation in the position which is determined as the input position in the input range on the touch panel 131 is produced, a smooth line corresponding to the movement of the inputter can be drawn. Even when the inputter for the touch panel 131 is an inputter, such as the finger of the user, in which its tip is thick to have a large input area on the touch panel 131, since the smoothing level for intensifying the degree of smoothing is set to be able to decrease a variation in the position which is determined as the input position in the input range on the touch panel 131, a smooth line corresponding to the movement of the inputter can be drawn. Hence, it is possible to draw a line corresponding to the movement of the inputter which produces a touch input on the touch panel 131.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. A touch input device comprising:
   a position detector that determines an input range in a touch input produced with an inputter on a touch panel and that detects, as a touch position, any position within the input range;
   a line information generator that generates line information which is information of a line connecting a plurality of the touch positions detected with the position detector;
   a smoothing level setter that sets, based on an area of the input range, a smoothing level indicating a degree of smoothing; and
   a smoothing processing processor that executes, on the line of the line information generated by the line information generator, smoothing corresponding to the smoothing level set by the smoothing level setter,
   wherein the position detector detects, as the touch position, a barycentric position in the input range.

2. The touch input device according to claim 1,
   wherein when the area of the input range is equal to or less than a threshold value, the smoothing level setter sets the smoothing level to a first smoothing level whereas when the area of the input range is greater than the threshold value, the smoothing level setter sets the smoothing level to a second smoothing level having a higher degree of smoothing than the first smoothing level.

3. The touch input device according to claim 1,
   wherein the smoothing level setter sets the smoothing level such that as the area of the input range is increased, the degree of smoothing is increased.

4. The touch input device according to claim 1,
   wherein the smoothing level setter sets, as the smoothing level, a smoothing parameter in an exponential smoothing method, and
   the smoothing processing processor executes smoothing on the line of the line information with the exponential smoothing method using the smoothing parameter set by the smoothing level setter.

5. The touch input device according to claim 1,
   wherein the position detector determines, as the input range, a region in which a detection value in the touch panel is equal to or greater than a predetermined value.

6. The touch input device according to claim 1,
   wherein the position detector determines, as the input range, a contact region of the touch panel and the inputter.

7. A touch input method of causing one or a plurality of processors to execute:
   determining an input range in a touch input produced with an inputter on a touch panel and detecting, as a touch position, any position within the input range;
   generating line information which is information of a line connecting a plurality of the touch positions;
   setting, based on an area of the input range, a smoothing level indicating a degree of smoothing; and
   executing, on the line of the line information, smoothing corresponding to the smoothing level,
   wherein detecting, as the touch position, a barycentric position in the input range.

8. A non-transitory computer-readable recording medium that records a touch input program for instructing one or a plurality of processors to execute:
   determining an input range in a touch input produced with an inputter on a touch panel and detecting, as a touch position, any position within the input range;
   generating line information which is information of a line connecting a plurality of the touch positions;
   setting, based on an area of the input range, a smoothing level indicating a degree of smoothing; and
   executing, on the line of the line information, smoothing corresponding to the smoothing level,
   wherein detecting, as the touch position, a barycentric position in the input range.

\* \* \* \* \*